(12) United States Patent
Katkoori et al.

(10) Patent No.: US 11,537,755 B1
(45) Date of Patent: Dec. 27, 2022

(54) SR FLIP-FLOP BASED PHYSICAL UNCLONABLE FUNCTIONS FOR HARDWARE SECURITY

(71) Applicants: Srinivas Katkoori, Wesley Chapel, FL (US); Rohith Prasad Challa, Dayton, NJ (US); Sheikh Ariful Islam, Tampa, FL (US)

(72) Inventors: Srinivas Katkoori, Wesley Chapel, FL (US); Rohith Prasad Challa, Dayton, NJ (US); Sheikh Ariful Islam, Tampa, FL (US)

(73) Assignee: University of South Florida, Tampa, FL (US)

( * ) Notice: Subject to any disclaimer, the term of this patent is extended or adjusted under 35 U.S.C. 154(b) by 288 days.

(21) Appl. No.: 17/066,877

(22) Filed: Oct. 9, 2020

Related U.S. Application Data

(60) Provisional application No. 62/912,894, filed on Oct. 9, 2019.

(51) Int. Cl.
  *G06F 21/75* (2013.01)
  *H03K 19/20* (2006.01)
  *H03K 3/037* (2006.01)

(52) U.S. Cl.
  CPC ........... *G06F 21/75* (2013.01); *H03K 3/0375* (2013.01); *H03K 19/20* (2013.01)

(58) Field of Classification Search
  None
  See application file for complete search history.

(56) References Cited

U.S. PATENT DOCUMENTS

| | | | |
|---|---|---|---|
| 2017/0324409 A1* | 11/2017 | Martinez | H03K 5/14 |
| 2019/0258766 A1* | 8/2019 | Wang | G06F 30/39 |
| 2020/0210628 A1* | 7/2020 | Karpinskyy | H04L 9/0866 |
| 2020/0285719 A1* | 9/2020 | Wang | G11C 29/32 |
| 2020/0403813 A1* | 12/2020 | Suresh | G11C 11/418 |
| 2021/0264014 A1* | 8/2021 | Wu | H04L 9/0822 |
| 2021/0280536 A1* | 9/2021 | Kuenemund | H01L 23/576 |

OTHER PUBLICATIONS

Nassif, Sanil. "Delay variability: sources, impacts and trends." 2000 IEEE International Solid-State Circuits Conference. Digest of Technical Papers (Cat. No. 00CH37056). IEEE, 2000.

(Continued)

*Primary Examiner* — Kaveh Abrishamkar
(74) *Attorney, Agent, or Firm* — Quarles & Brady LLP

(57) ABSTRACT

The present disclosure presents various systems and methods for implementing a physical unclonable function device. One such method comprises providing an integrated circuit having a plurality of set/reset flip flop logic circuits, wherein each of the set/reset flip flop logic circuits enters a metastable state for a particular input sequence. The method includes varying circuit parameters for each of the plurality of set/reset flip flop logic circuits to account for manufacturing variations in the set/reset flip flop logic circuits and enable generating a stable but random output in response to the particular input sequence. Thus, by applying the particular input sequence to the integrated circuit, a unique identifier for the integrated circuit can be derived from an output response of the plurality of set/reset flip flop logic circuits.

20 Claims, 16 Drawing Sheets

(56) References Cited

OTHER PUBLICATIONS

Ardakani, Amir; et al. "A secure and area-efficient FPGA-based SR-Latch PUF." 2016 8th International Symposium on Telecommunications (IST). IEEE, 2016.

Bossuet, Lilian, et al. "A PUF based on a transient effect ring oscillator and insensitive to locking phenomenon." IEEE Transactions on Emerging Topics in Computing 2.1 (2013): 30-36.

Danger, Jean-Luc, et al. "Analysis of mixed puf-tmg circuit based on sr-latches in fd-soi technology." 2018 21st Euromicro Conference on Digital System Design (DSD). IEEE, 2018.

Fyrbiak, Marc, et al. "Hardware reverse engineering: Overview and open challenges." 2017 IEEE 2nd International Verification and Security Workshop (IVSW). IEEE, 2017.

Lim, Daihyun, et al. "Extracting secret keys from integrated circuits." IEEE Transactions on Very Large Scale Integration (VLSI) Systems 13.10 (2005): 1200-1205.

Maiti, Abhranil; et al. "A systematic method to evaluate and compare the performance of physical unclonable functions." Embedded systems design with FPGAs. Springer, New York, NY, 2013. 245-267.

Su, Ying; et al. "A digital 1.6 pJ/bit chip identification circuit using process variations." IEEE Journal of Solid-State Circuits 43.1 (2008): 69-77.

Suh, G. Edward; et al. "Physical unclonable functions for device authentication and secret key generation." 2007 44th ACM/IEEE Design Automation Conference. IEEE, 2007.

Rührmair, Ulrich, et al. "PUF modeling attacks on simulated and silicon data." IEEE transactions on information forensics and security 8.11 (2013): 1876-1891.

Wang, Sying-Jyan; et al. "Register PUF with No Power-Up Restrictions." 2018 IEEE International Symposium on Circuits and Systems (ISCAS). IEEE, 2018.

Zaiivaka, Siarhei S., et al. "Multi-valued arbiters for quality enhancement of PUF responses on FPGA implementation." 2016 21st Asia and South Pacific design automation conference (ASP-DAC). IEEE, 2016.

Habib, Bilal; et al. "implementation of efficient SR-Latch PUF on FPGA and SoC devices." Microprocessors and Microsystems 53 (2017): 92-105.

\* cited by examiner

SR FLIP-FLOP BASED PHYSICAL UNCLONABLE FUNCTIONS FOR HARDWARE SECURITY

CROSS-REFERENCE TO RELATED APPLICATION

This application claims priority to U.S. provisional application entitled, "SR Flip-Flop Based Physical Unclonable Functions for Hardware Security," having Ser. No. 62/912,894, filed Oct. 9, 2019, which is entirely incorporated herein by reference.

BACKGROUND

Due to the horizontal business model and vertical disintegration of integrated (IC) design, most of ICs' manufacturing and testing of fabless design houses are performed in foreign foundries. In the heart of this design ecosystem, original intellectual property (IP) owners face several security challenges including overproduction, counterfeiting, authentication, and trust in manufactured products. Although cryptography algorithms have been put into practice to perform the authentication, they are difficult to upload due to recent attacks. Moreover, deployment of computationally intensive cryptographic algorithms in resource constrained IoT (Internet of Things) devices limit their wide adoption.

In contrast, among all the possible existence of security solutions, Physical Unclonable Function (PUF) acts as one-way function that can map certain stable inputs (challenges) to pre-specified outputs (responses). PUF utilizes inherent silicon variations such that if a similar design is manufactured onto two different dies, process variations would act differently within and across both dies and this forms the basis for a PUF. Ideally, a PUF implementation should be low cost, tamper-evident, unclonable, and reproducible. The PUF response also need to be invariant to environmental variations.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
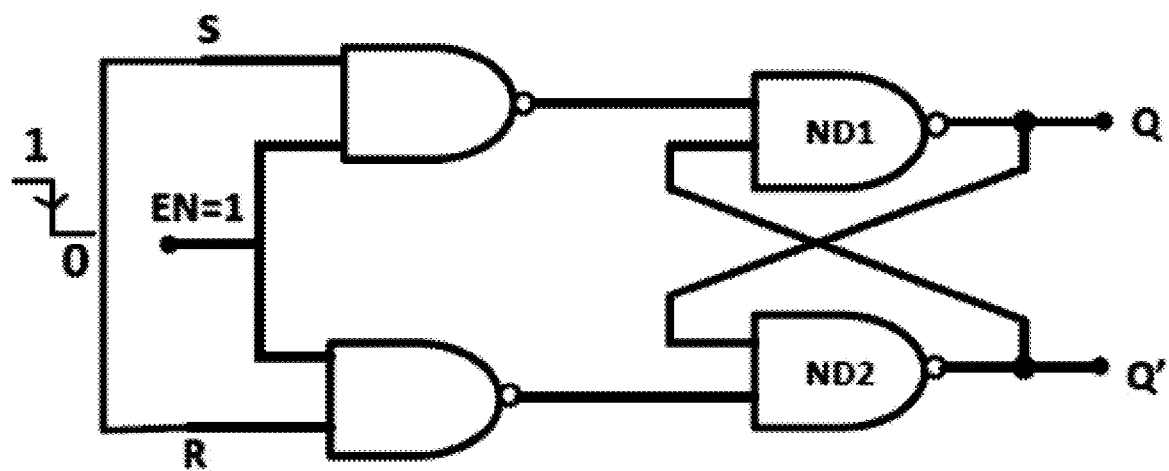
FIG. 1 is a schematic diagram of an exemplary embodiment of a clock enabled cross-coupled NAND-based SR-FF construction in accordance with embodiments of the present disclosure.

Physical Unclonable Functions (PUFs) have emerged as a promising solution to identify and authenticate integrated circuits (ICs). Generally, a physical unclonable function acts as one-way function that maps certain stable inputs (challenges) to pre-specified outputs (responses) in a semiconductor device.

In accordance with the present disclosure, a Set/Reset (SR) Flip-Flop (FF) based PUF can generate challenge-response pairs within a design resulting from the manufacturing process variations. For example, an SR-FF can store a 1-bit signal depending on the valid input signals applied to its inputs. However, for invalid signals, SR-FF can output a valid signal due to relative timing differences created by manufacturing variations. Accordingly, in accordance with various embodiments, the present disclosure presents a novel NAND-based Set-Reset (SR) Flip-flop (FF) PUF design, such as for security enclosures of the area- and power-constrained Internet-of-Things (IoT) edge node, among other devices. An exemplary SR-FF based PUF is constructed during a unique race condition that is (normally) avoided due to inconsistency. The present disclosure shows, when both inputs (S and R) are logic high ('1') and followed by logic zero ('0'), the outputs Q and $\overline{Q}$ can settle down to either 0 or 1 or vice-versa depending on statistical delay variations in cross-coupled paths.

During experimental testing, the process variations were incorporated during SPICE-level simulations to leverage the capability of SR-FF in generating the unique identifier of an IC. Experimental results for 32 nm, 45 nm, and 90 nm process nodes show the robustness of SR-FF based PUF responses in terms of uniqueness, randomness, uniformity, and bit(s) biases. Furthermore, physical synthesis was performed to evaluate the applicability of an SR-FF based PUF on five designs from OpenCores in three design corners (best-case, typical-case, and worst-case). The estimated overhead for power, timing, and area in these three design corners are negligible.

An exemplary embodiment of the SR-FF based PUF circuit presented herein can be employed in a resource constrained IoT (Internet of Things) device to perform secure authentication. Without any deployment of additional circuitry, an embodiment of the SR-FF based PUF can act as a frontier for systems that use Non-Volatile Memory (NVM) and computation-intensive cryptographic protocols. Given a design with memory elements implemented with SR-FF(s), an exemplary method of the present disclosure utilizes variations in transistor length and threshold voltage to generate PUF responses, in one embodiment. Such a method does not introduce any new circuit elements. Instead, it selectively chooses the response (output voltage) of the SR-FF(s) when a set of input signals are applied to it, in one embodiment.

Comparatively, in recent years, a wide variety of PUF architectures have been investigated that can transform device properties (e.g. threshold voltage, temperature, gate length, oxide thickness, edge roughness) to a unique identifier or key of a certain length. In general, a PUF is a digital fingerprint that serves as a unique identity to silicon ICs and characterized by inter-chip and intra-chip variations. Inter-chip offers the uniqueness of a PUF that helps to conclude that the key or unique identifier produced for a die is different from other keys. Intra-chip determines the reliability of the key produced that should not change for multiple iterations on the same die. For a signal, metastability occurs when the specifications for setup and hold time are not met and unpredictable random value appears at the output. Although metastable is an unstable condition, due to process variations, such metastability generates a stable but random state (either '0' or '1'), which is not known apriori.

In previous works, metastability in cross-coupled paths has been exploited to design a PUF with a SR latch and Ring Oscillator (RO) circuitry. Although latch-based PUF designs offer unique signatures to ICs, they suffer from signal skew and delay imbalance in signal routing paths. Thus, additional hardware, such as Error Correction Code (ECC) circuitry, is commonly employed to post-process the instable PUF responses. For example, in a publication titled "Register PUF with No Power-Up Restrictions," in 2018 IEEE ISCAS, pages 1-5 (May 2018), Su et al. presented cross-coupled logic gates to create a digital ID based on threshold voltage, in which the architecture was composed of a latch followed by a quantizer and a readout circuit to produce the PUF ID. However, a readout circuit is generally expensive and limits its application to a low-power device. FPGA-based SR-latch PUF was presented in a Habib et al. publication titled "Implementation of Efficient SR-Latch PUF on FPGA and SOC Devices," in Microprocessors and Microsystems, 53:92-105 (2017), and an Ardakani et al publication titled "A Secure and Area-Efficient FPGA-Based SR-Latch PUF," in 2016 IST, pages 94-99 (September 2016). Due to temporal operating conditions, ECC was employed to reliably map a one-to-one challenge-response pair in both approaches. To alleviate power-up values from a memory-based PUF, registers based on edge-triggered D-FF were proposed in the Su et al. publication. Here, the authors suggested to include an expensive synchronizer in Clock Domain Signal (CDC) signals to get a stable PUF response. A framework of 'body-bias' adjusted voltage on SR-latch timing using FD-SOI (Fully Depleted Silicon on Insulator) technology was presented in a Danger et al. publication titled "Analysis of Mixed PUF-TRNG Circuit Based on SR Latches in FD-SOI Technology," in 2018 DSD, pages 508-515 (August 2018). To get a correct PUF response, authors employed buffers along the track at a top and bottom of latches that suffer from responses biasedness.

Transient Effect Ring Oscillator (TERO) PUF, as described in L. Bossuet et al, "A PUF Based on a Transient Effect Ring Oscillator and Insensitive to Locking Phenomenon," IEEE TETC, 2(1):30-36 (2014), utilized metastability to generate the responses with a binary counter, accumulator, and shift register. Although the architecture was scalable, it required large hardware resources. Thus, a TERO-PUF in the Bossuet publication incurred significant area overhead that included a counter, an accumulator, and a shift register.

The foregoing deficiencies can be overcome by harvesting deep-metastability in bi-stable memory with SR-FF to design a low-cost PUF and high quality challenge-response pairs (CRPs) in accordance with the embodiments of the present disclosure. While the majority of works utilizing metastability to design PUF employ additional hardware to count the oscillation frequency, the present disclosure is unlike these previous studies in that it (a) employs SR-FF (without additional hardware) to construct a low-cost PUF and (b) reuses the SR-FF already in the original intellectual property (IP) circuitry by varying channel length and threshold voltage to account for intra- and inter-chip variations.

Accordingly, the present disclosure designs and analyzes an embodiment of a novel SR-FF based PUF. For a NAND gate based SR-FF, the input condition for S(Set)='1' and R(Reset)='1' must be avoided as it produces an inconsistent condition. In particular, when S=R='1' is applied followed by S=R='0', the outputs Q and $\overline{Q}$ will undergo a race condition. Due to manufacturing variations, the state due to the race condition will settle as either '0' or '1'. Further, due to intrachip process variations, some flip flops in a chip will settle in a '0' state, while others will settle in a '1' state, and, due to inter-chip variations, such a signature will be different across the chips.

The present disclosure presents a PUF design that relies on the cross-coupled path in an SR-FF configuration. Each bit of a PUF response can be extracted from a metastability induced random value in the output (Q) due to a particular input sequence at SR-FF. This random value will eventually evaluate to a stable logic due to process variability.

A clock enabled cross-coupled NAND-based SR-FF construction is shown in FIG. 1 which does not require an additional synchronizer to control the input conditions. Set-Reset (SR) Latch has the forbidden input combination, namely, S=R=1 which results in both Q and $\overline{Q}$ equal to 1. After S=R=1 input, if both inputs are lowered (S=R=0), there is a race condition between the two cross-coupled NAND gates (ND1 and ND2) making Q and $\overline{Q}$ to linger around a Vdd/2 value. Although such a race condition is prohibited during normal or regular circuit operation, it can influence the output to generate a state determined by the mismatch in the underlying device parameters (such as transistor length, threshold voltage, etc.). An analysis of the race behavior is seemingly dependent on the precise phase relation between clock and input data. Such an input-referred event sequence can be exploited to generate a PUF response in accordance with the present disclosure.

Figure 2:
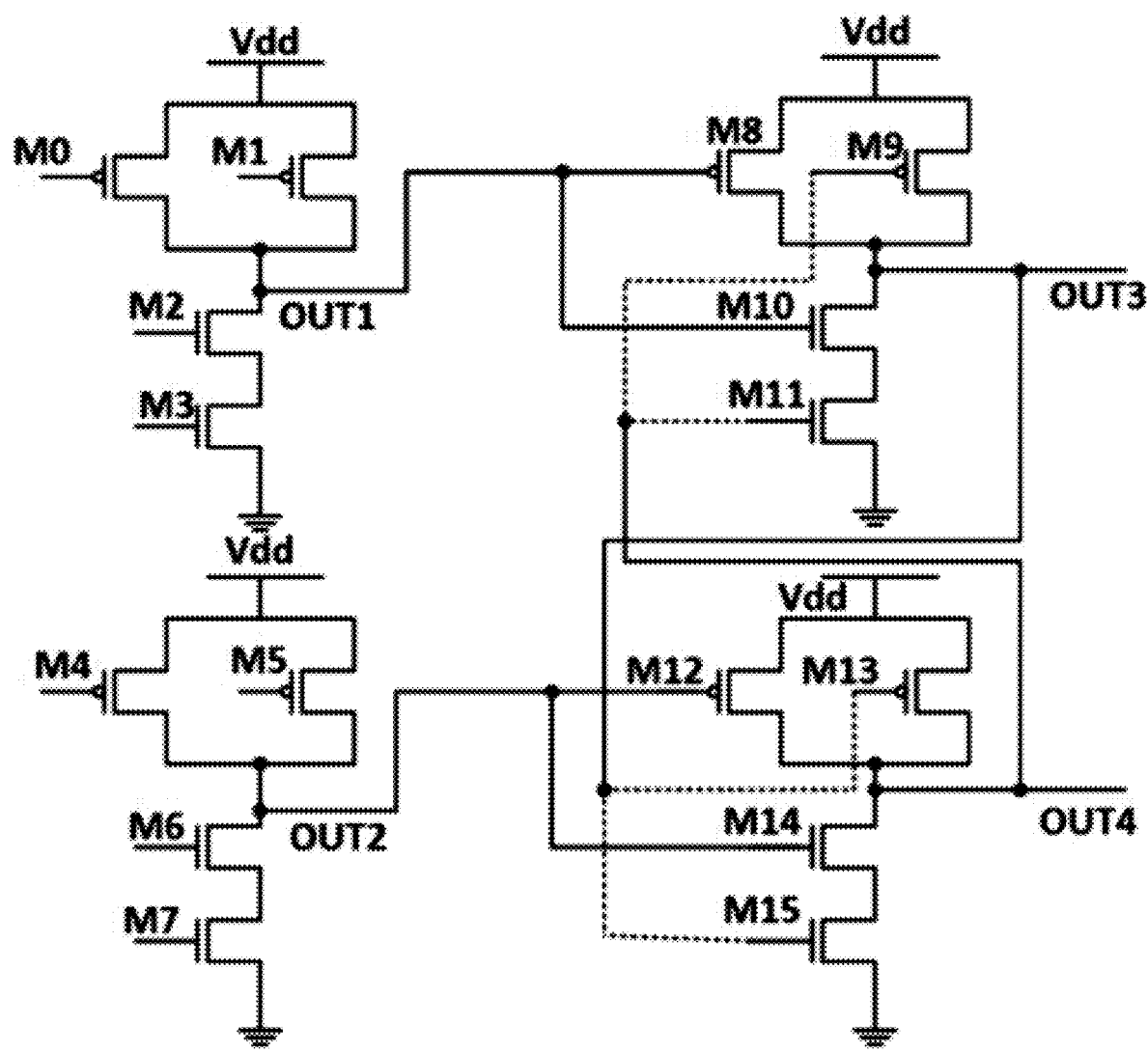
FIG. 2 is a transistor level schematic of a SR-FF for device variability analysis in accordance with embodiments of the present disclosure.

Next, FIG. 2 shows a transistor level schematic of a SR-FF for device variability analysis. As the input stimulus (logic '1') is applied to M2-M3, PMOS devices of ND1 will be turned on and will produce logic '1' on OUT3. If the next set of input signals being low appear within the active edge of CLK, a random binary value (e.g. high impedance) would appear in both OUT3 and OUT4. Hence, to reduce the possibility of a race condition, the transistor length or threshold voltage of one of the output NAND gates can be varied to increase the delay variability and generate a stable response. For example, to propagate the inputs from ND2 to OUT4 quickly, the transistors' (M12-M15) length can be sampled. Therefore, device parameters mismatch in a set of transistors can aid in evaluating a state faster and those transistors (M8-M11) with smaller mismatch will fall behind in the race. Hence, the precise tuning of gate length not only helps to generate a PUF response but also helps to recover from metastability.

Figure 3:
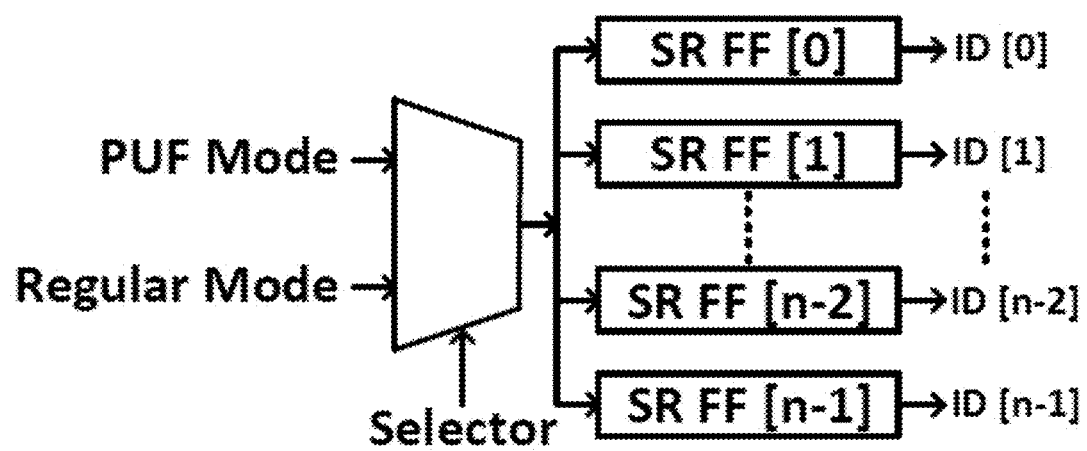
FIG. 3 is a diagram showing an architecture of dual-mode n-bit array SR-FFs with an input multiplexer (MUX) to select either a PUF mode or a regular mode.

For analysis and comparison purposes with FIG. 4 (below), FIG. 3 shows the architecture of dual-mode n-bit array SR-FFs with an input multiplexer (MUX) to select either a PUF mode or a regular mode. As each SR-FF would generate a single bit key, a PUF signature of the maximum size of FF instances can be obtained. However, the PUF signature suffers from a multiplexer output that has to be sufficiently long to reach all SR-FF instances. The depicted architecture also increases the delay to produce random output at Q depending on the longest distance from MUX output to an SR-FF instance. As a result, both higher wire length from the MUX output and the maximum transition time due to metastability will decrease the timing performance of an SR-FF based PUF during a regular operation. Furthermore, such architecture may be susceptible to a key-guessing attack under a single clock pulse. Hence, the architecture in FIG. 3 is biased towards variations in the connecting wire length and width. This, in turn, reduces the impact of the transistors' local variation. In short, the higher the depth of PUF timing paths, the less its response will depend on the transistors' behavior.

Figure 4:
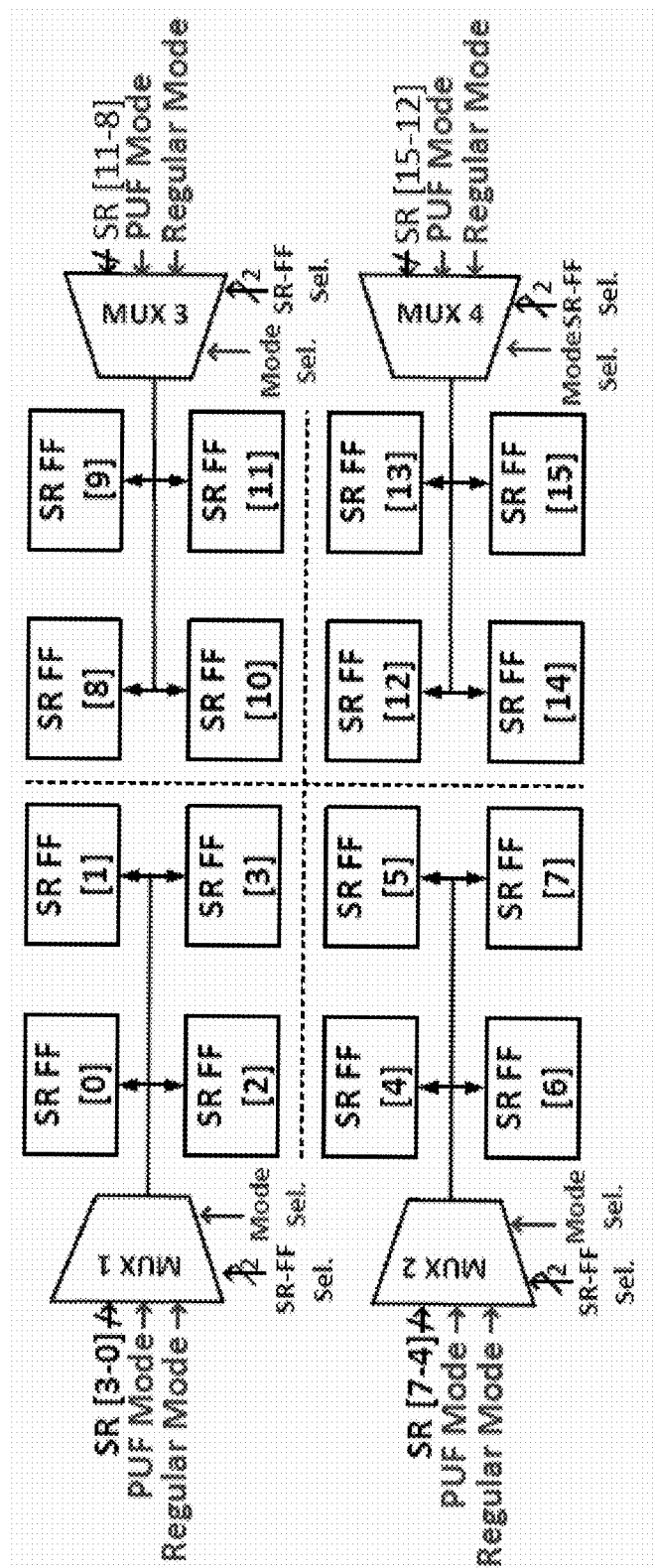
FIG. 4 is a diagram showing a centroid architecture (4×4 grid) of 16-bit SR-FFs built upon the architecture of FIG. 3 with additional MUXs in accordance with embodiments of the present disclosure.

Next, FIG. 4 shows a centroid architecture of 16-bit SR-FFs (e.g., a 4×4 grid) built upon the architecture of FIG. 3 with additional MUXs to improve (or reduce) the delay and thwart any potential key-guessing attack. The architecture of FIG. 4 also results in improved bit distribution by preventing edge-effects. In the figure, each multiplexer has a three selector bit, of which, two are used to select an SR-FF in a grid and the remaining bit is used for determining mode (PUF (non-regular)) or normal (regular)) selection. In various embodiments, a controller is embedded in the architecture to aid in the signal extraction process. Depending on the number of controllable MUXs, the size of the partitions or grids can increase or decrease.

During analysis and testing, delay variations are investigated in NAND gates of the feedback path that most affect the gate delay. The disclosed concepts are validated with SPICE-level simulations for 32 nm, 45 nm, and 90 nm process nodes to establish the robustness of the proposed PUF responses for 16-, 32-, 64-, and 128-bit responses. In particular, Monte Carlo (MC) simulations of SR-FF PUF at SPICE level are performed using Synopsys HSPICE for three CMOS processes (32 nm, 45 nm, and 90 nm). MC can perform device variability analysis within six-sigma limit, hence the Challenge-Response Pairs (CRPs) collected using MC is comparable to CRPs from manufactured ICs. The PUF structure is simulated for 1000 iterations, analogous to 1000 different dies on a 300 mm wafer at nominal voltage (1V). Several works, such as D. Lim et al, "Extracting Secret Keys from Integrated Circuits, IEEE TVLSI, 13(10):1200-1205 (October 2005), G. E. Suh and S. Devadas, "Physical Unclonable Functions for Device Authentication and Secret Key Generation," in 2007 44th ACM/IEEE DAC, pages 9-14 (June 2007), and U. Rhrmair et al, "PUF Modeling Attacks on Simulated and Silicon Data," IEEE TIFS, 8(11): 1876-1891 (November 2013), in the literature have validated PUF design through SPICE level simulations. PUF responses are then evaluated according to parameters proposed by a Maiti et al. publication titled "A Systematic Method to Evaluate and Compare the Performance of Physical Unclonable Functions" (2011) which include uniqueness, reliability, uniformity/randomness, and bit aliasing/ response collision. Although process variations impact channel length, length variability is maintained within (intra-die) 15% and across (inter-die) 33% of nominal value to generate CRPs. The performance overhead of physical synthesis is also analyzed for five register-transfer-level (RTL) designs with centroid architecture.

Figure 5A:
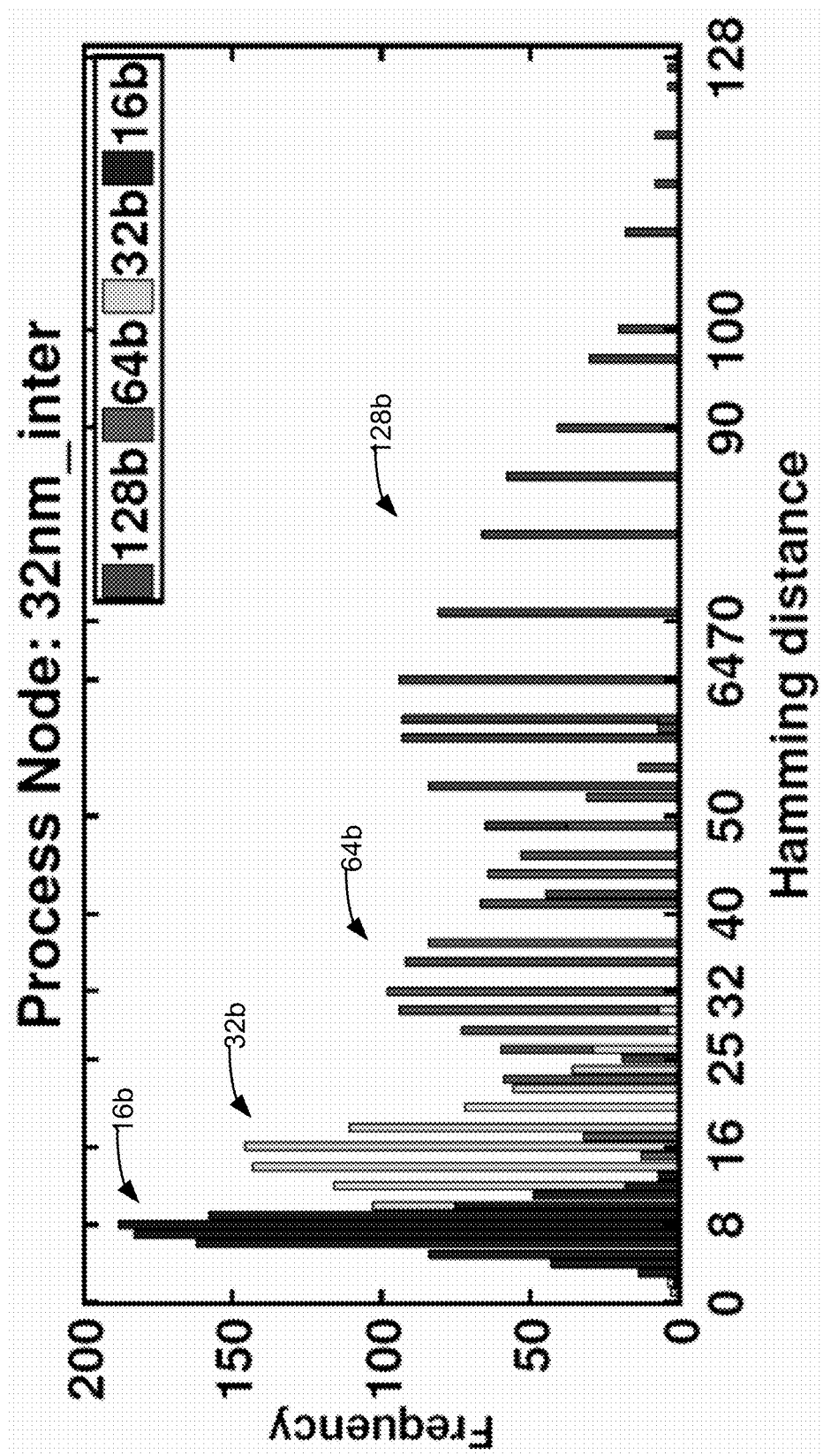
FIGS. 5A-5C are diagrams showing overlay histograms of inter-chip Hamming distance (5A-5C) and intra-chip Hamming distances (5D-5F) for four key lengths in 32 nm, 45 nm, and 90 nm process nodes in accordance with the present disclosure.
Figure 5B:
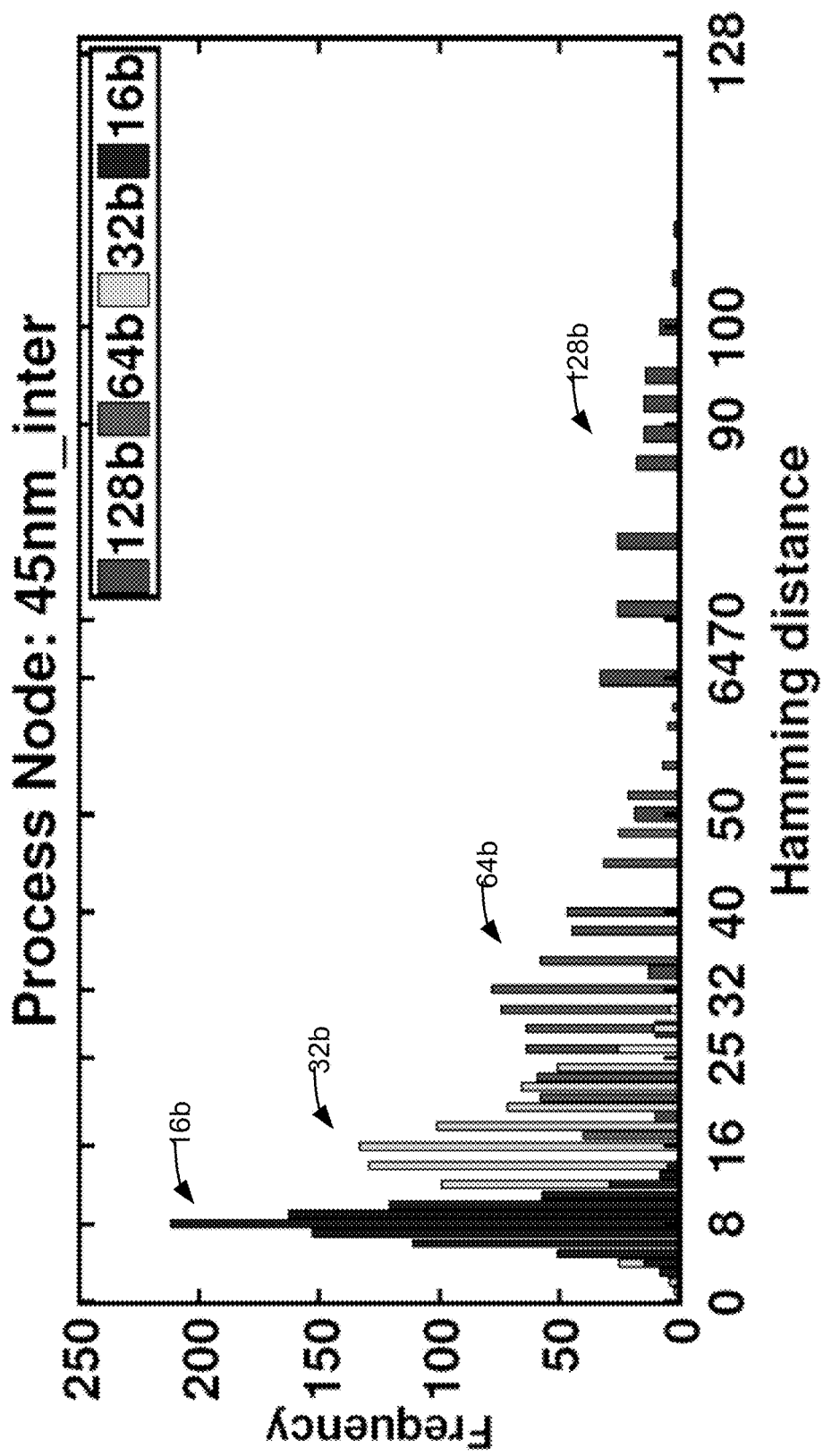
Figure 5C:
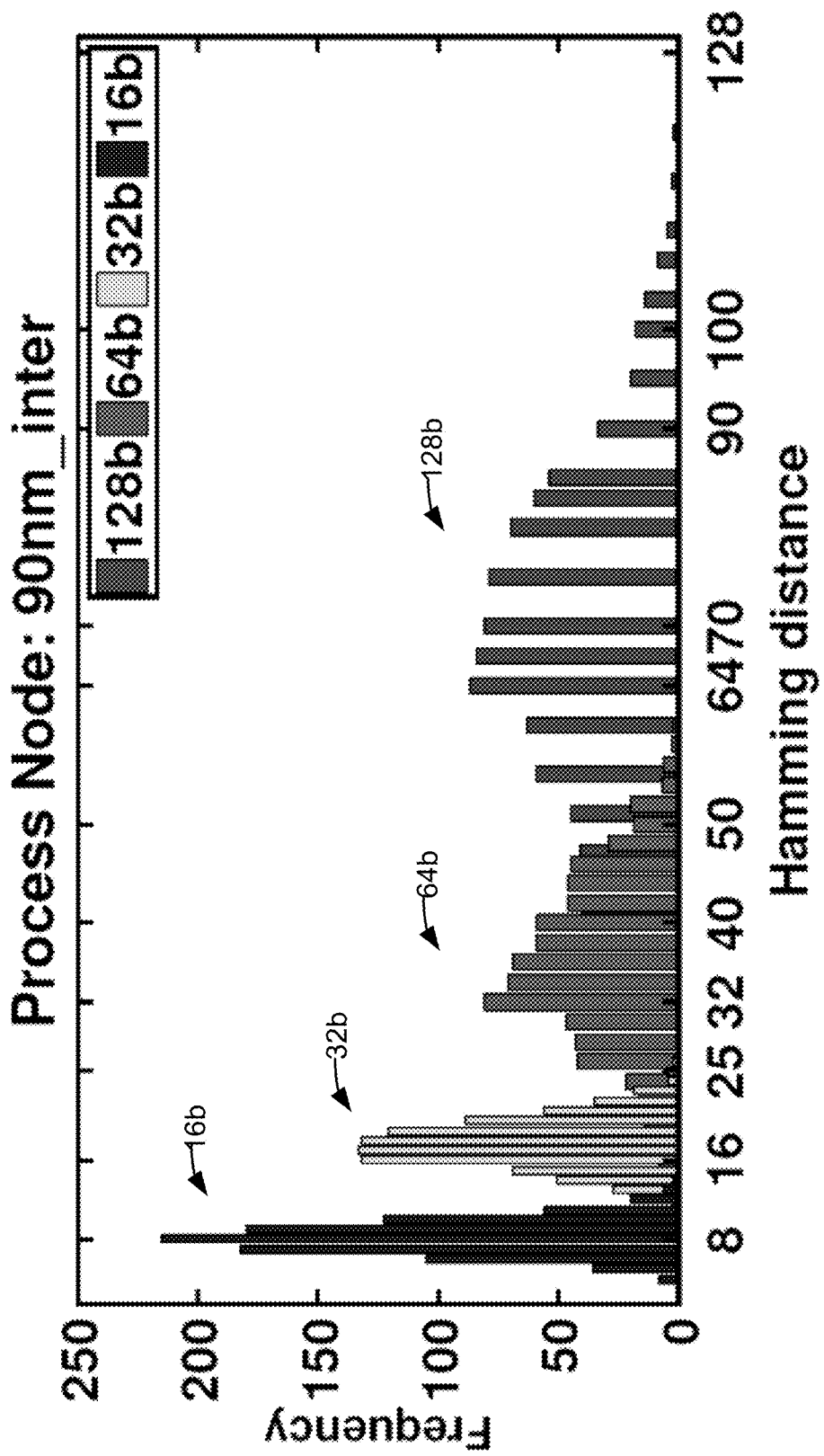

As discussed above, PUF responses may be evaluated in terms of uniqueness, reliability, uniformity/randomness, and bit aliasing/response collision. Uniqueness provides a measurement of interchip variation. The uniqueness can be measured by calculating Hamming Distance (HD) of two pair-wise dies. Ideally, two dies (chips) show a distinguishable response (HD~50%) to a common challenge. FIGS. 5A-5C shows inter-chip HD of four different key sequences. For all keys, two thousand comparisons were made to verify uniqueness. One can see that the average HD for all key-lengths are close to 49%.

Figure 5D:
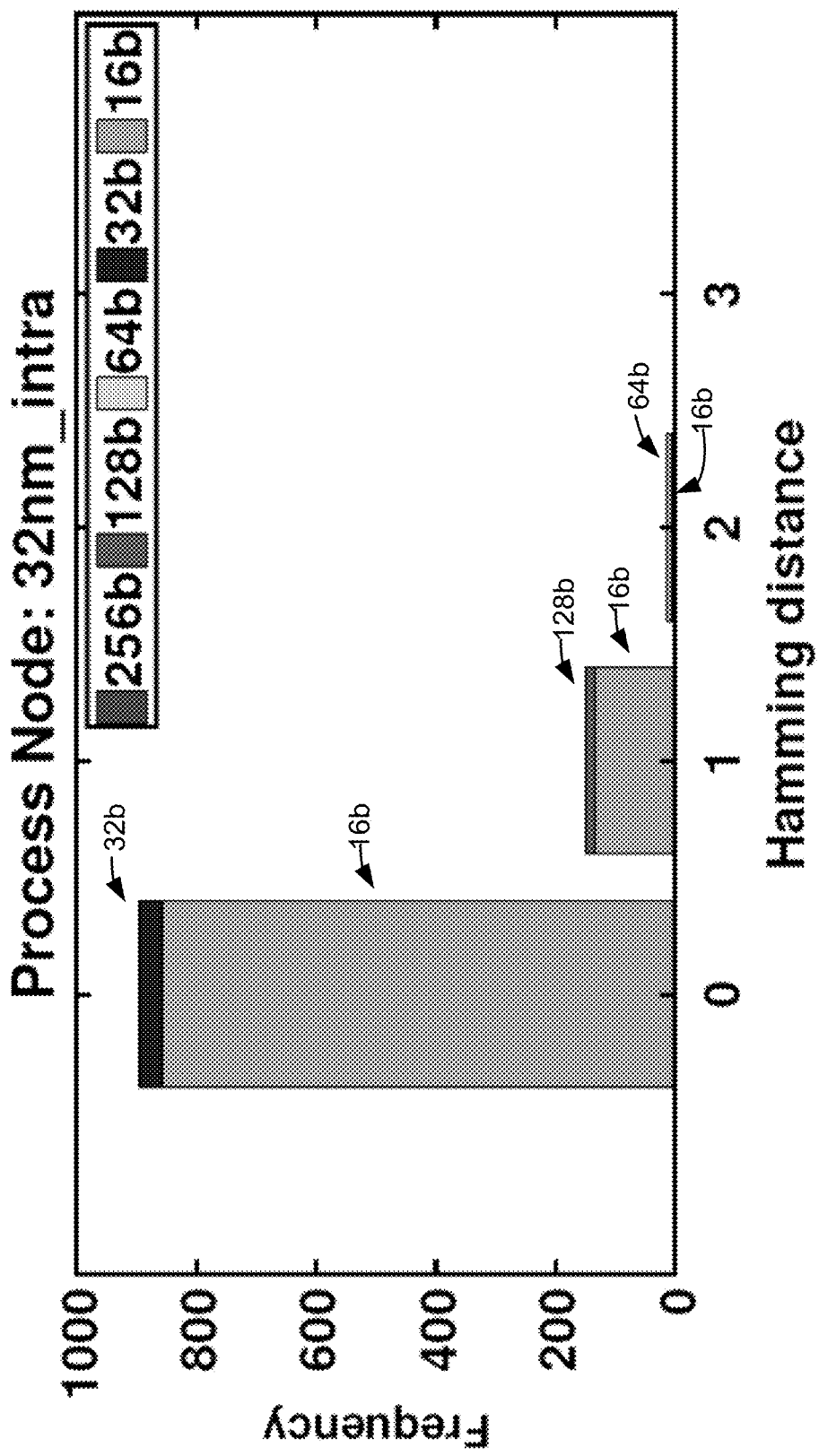
Figure 5E:
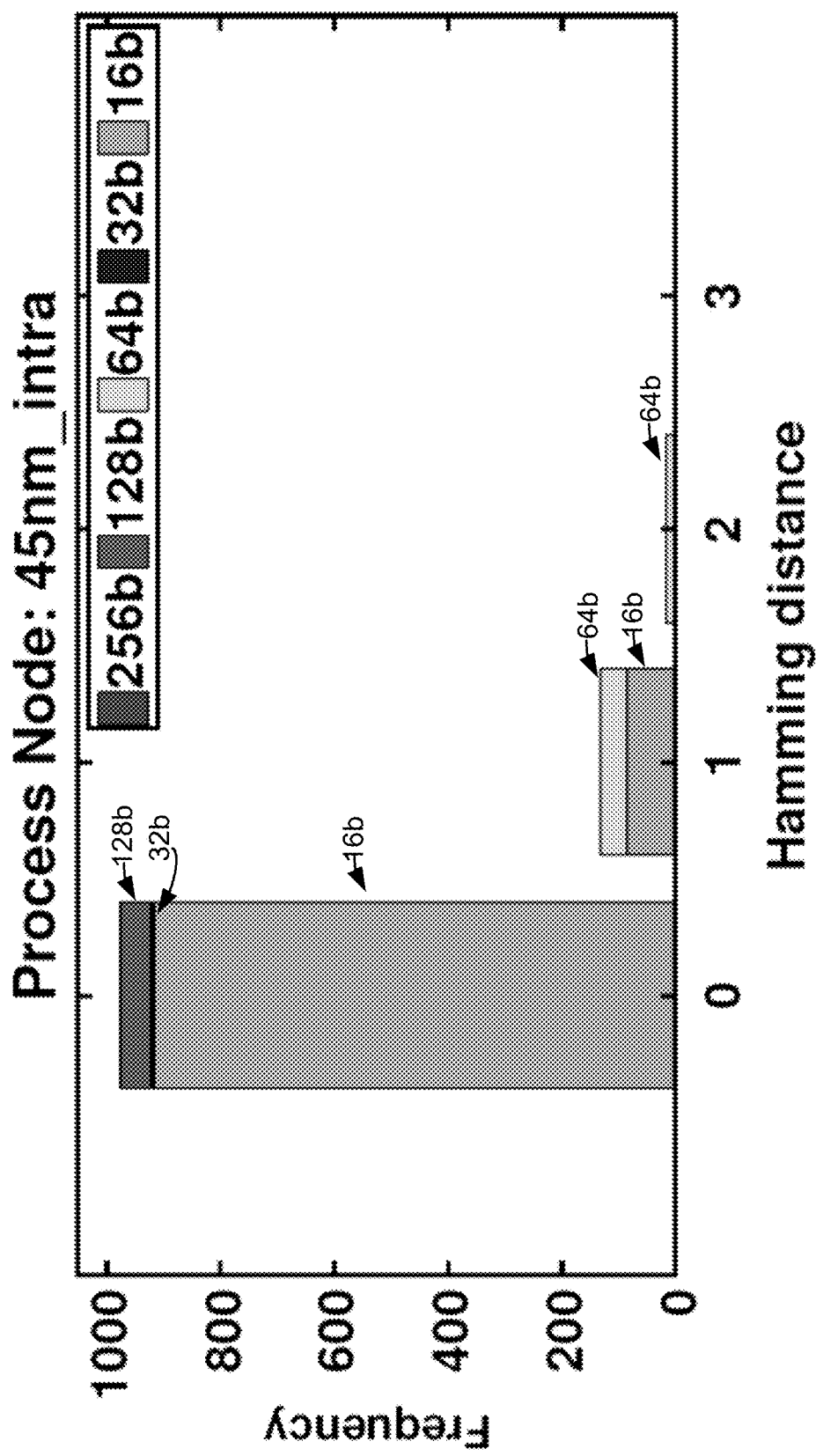
Figure 5F:
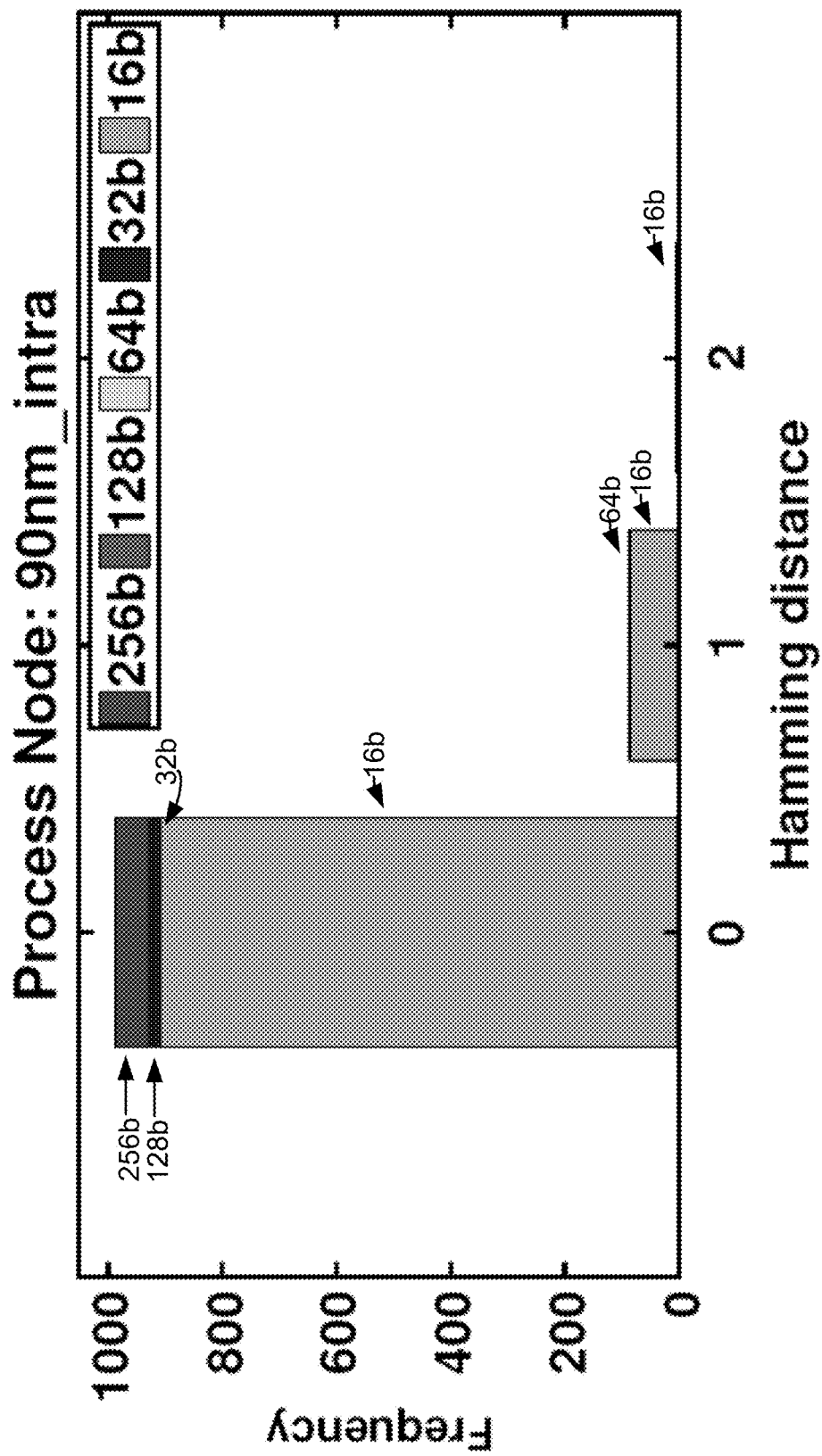

Next, the reliability can be measured from Bit Error Rate (BER) of PUF responses for intra-chip variation. Ideally, a PUF should maintain the same response (100% reliable or 0% variation) on different environmental variations (supply voltage, temperature) under the same challenge. FIGS. 5D-5F show the intra-die HD for five key length in three process nodes at a different temperature (0° C. to 80° C.). The reliability (HD=0) for 16-, 32-, 64-, and 128-bit registers are 92.3%, 92.2%, 90.7%, and 92.7% respectively.

Figure 6A:
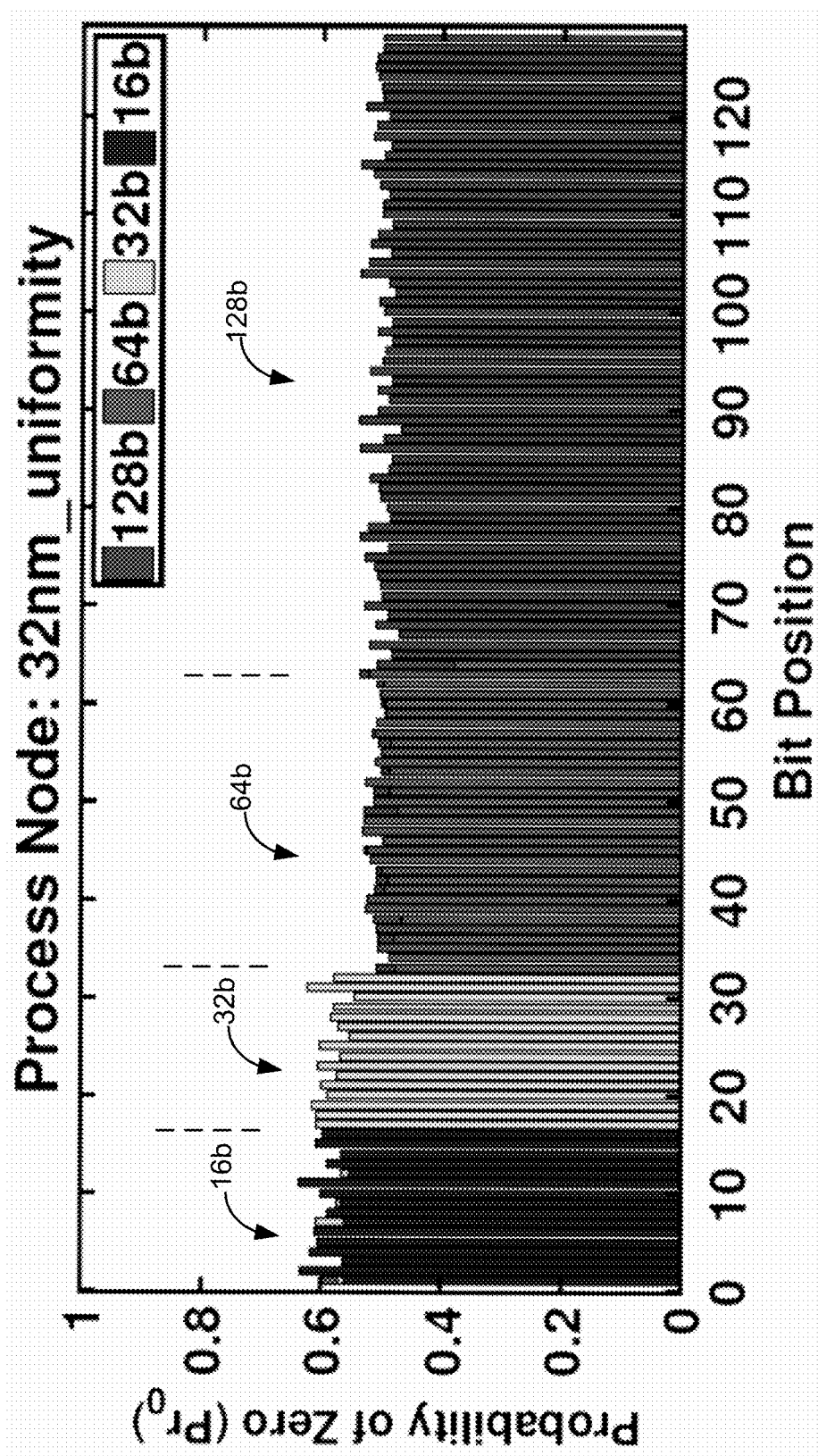
FIGS. 6A-6C are diagrams showing histograms for a probability of zero in each bit position for four (16-, 32-, 64-, and 128-bit) key lengths in 32 nm, 45 nm, and 90 nm process nodes in accordance with the present disclosure.
Figure 6B:
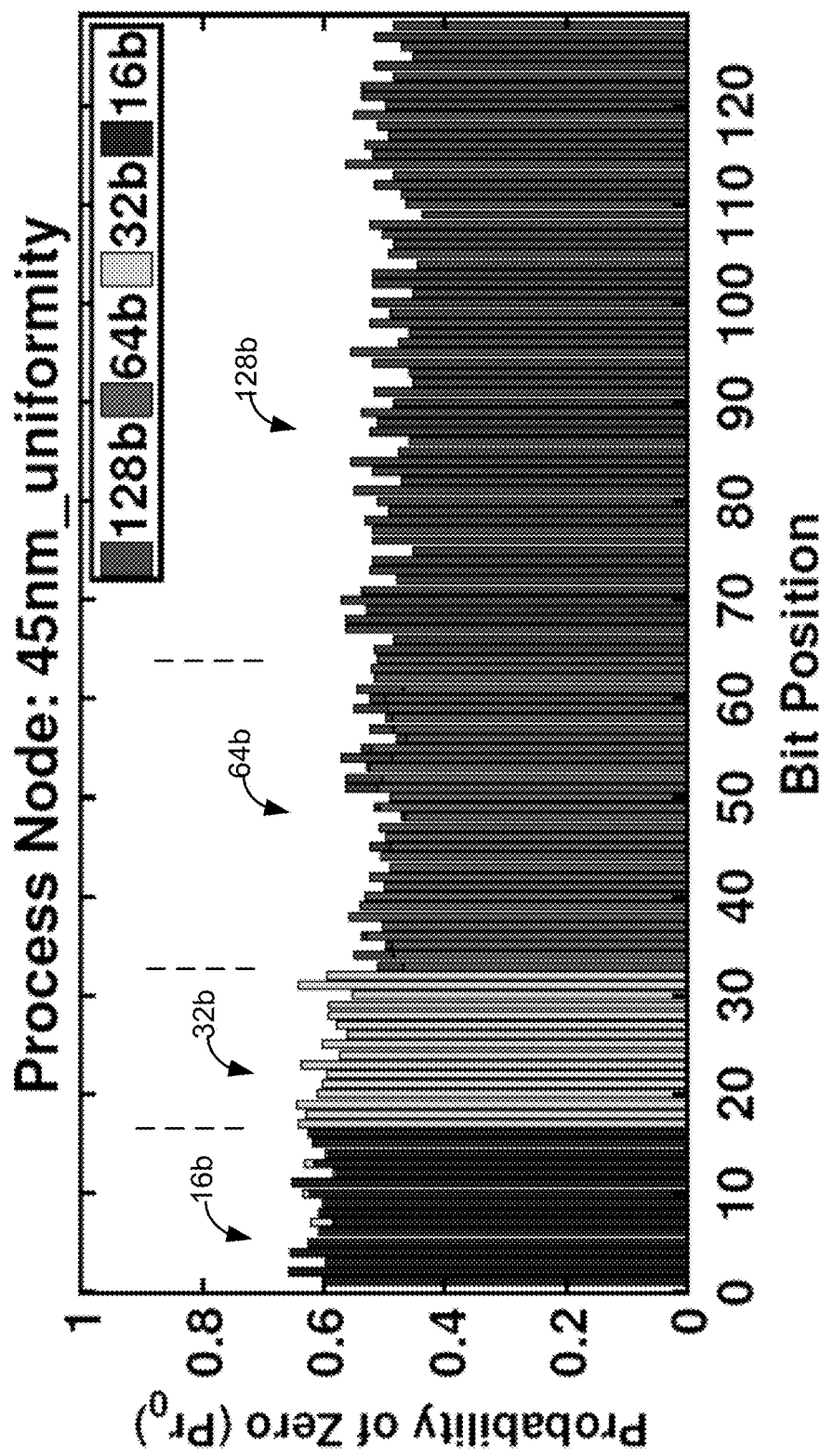
Figure 6C:
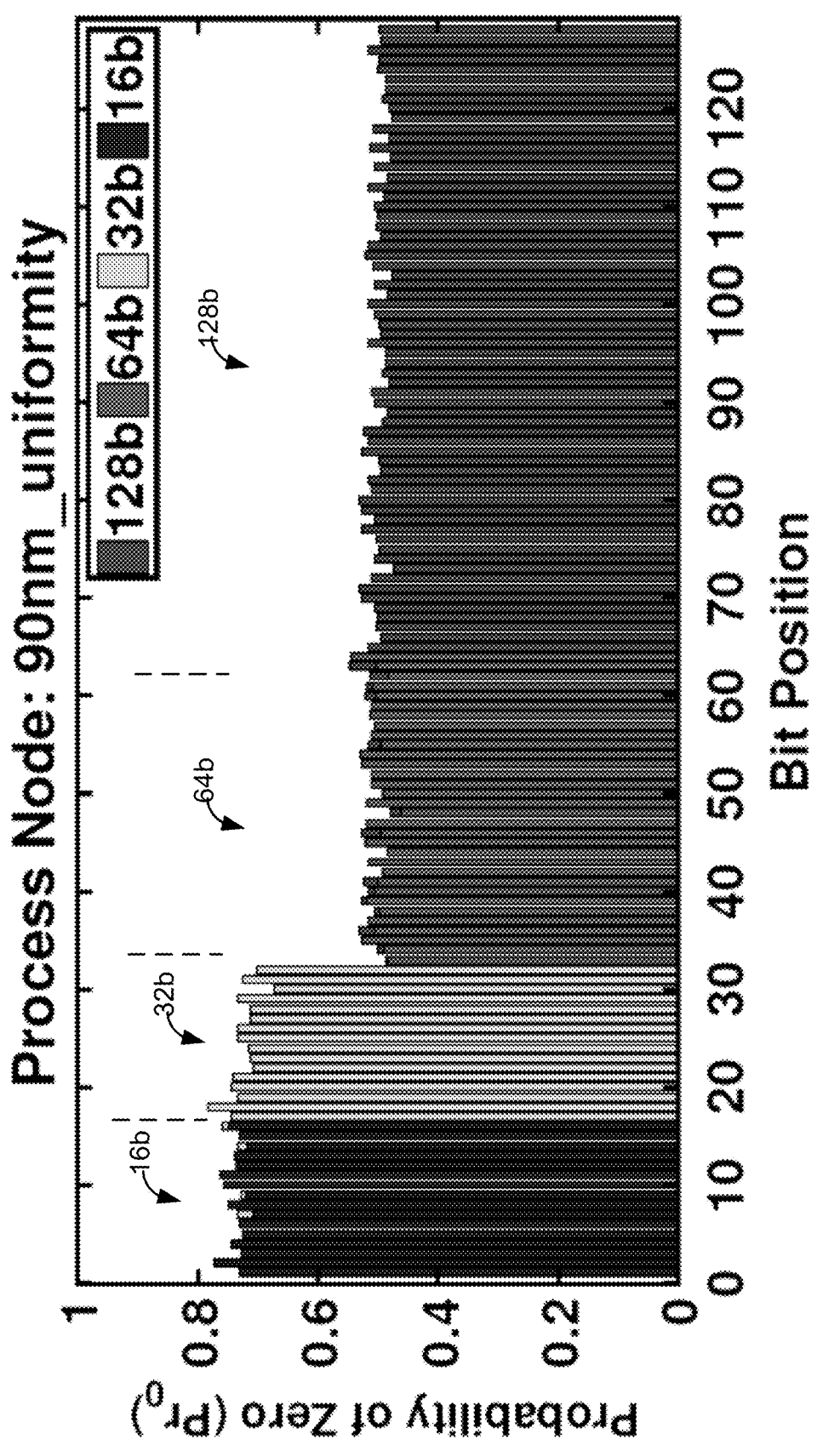

For uniformity/randomness, uniformity measures the ability of a PUF to generate uncorrelated '0's and '1's in the response. Ideally, PUF should generate '0's and '1's with equal probability in a response. This ensures the resilience of guessing PUF response from a known challenge. The probability of zero is bound within 0.5 and 0.7 for four different key lengths in FIGS. 6A-6C. Although the ideal value of uniform probability should be 0.5, variability in gate delay due to process variability impacts the even distribution of '0's and '1's.

Figure 7A:
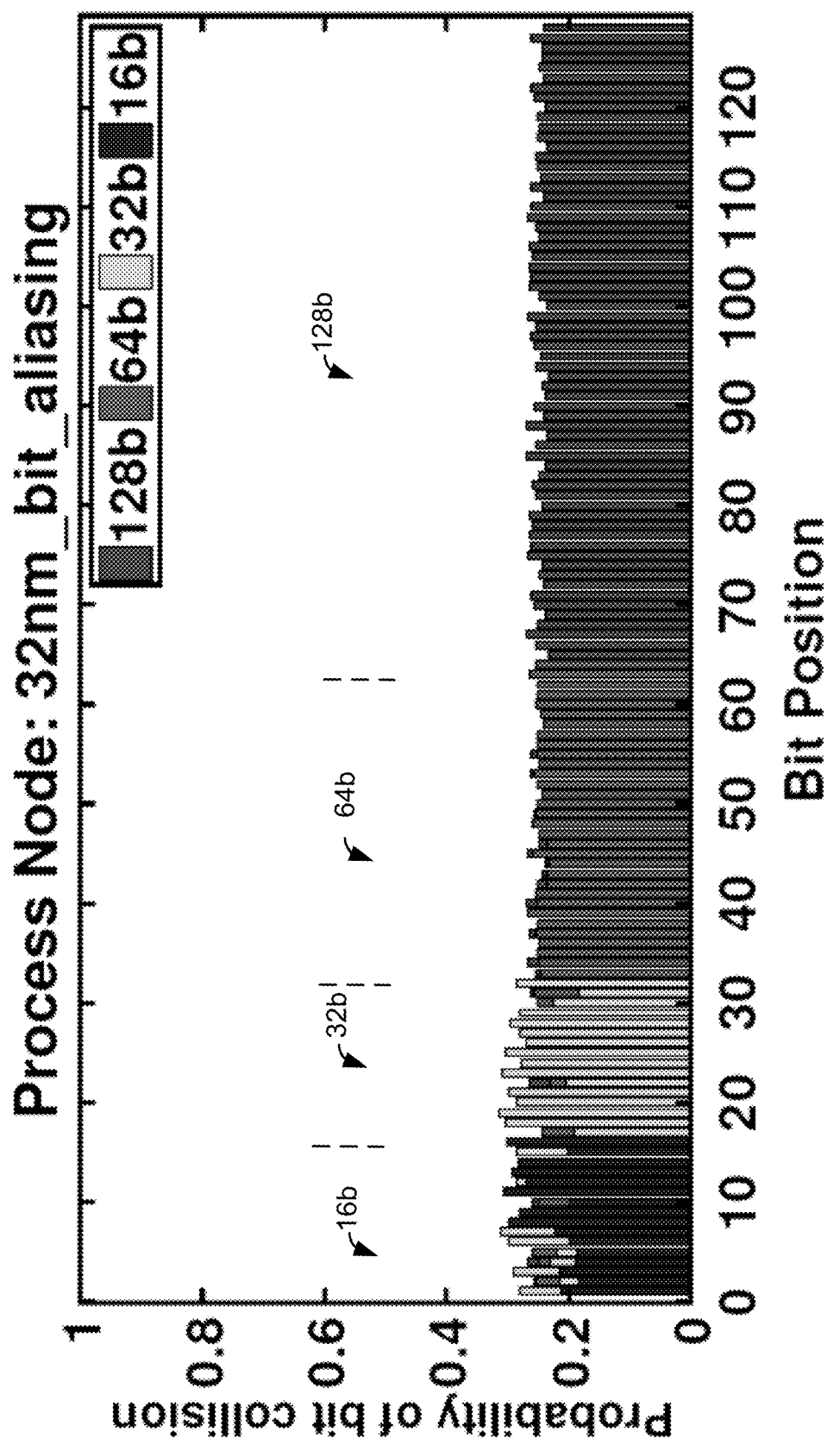
FIGS. 7A-7C are diagrams showing overlay histograms of average probability of collision in each bit position for four (16-, 32-, 64-, and 128-bit) key lengths in 32 nm, 45 nm, and 90 nm process nodes in accordance with the present disclosure.
Figure 7B:
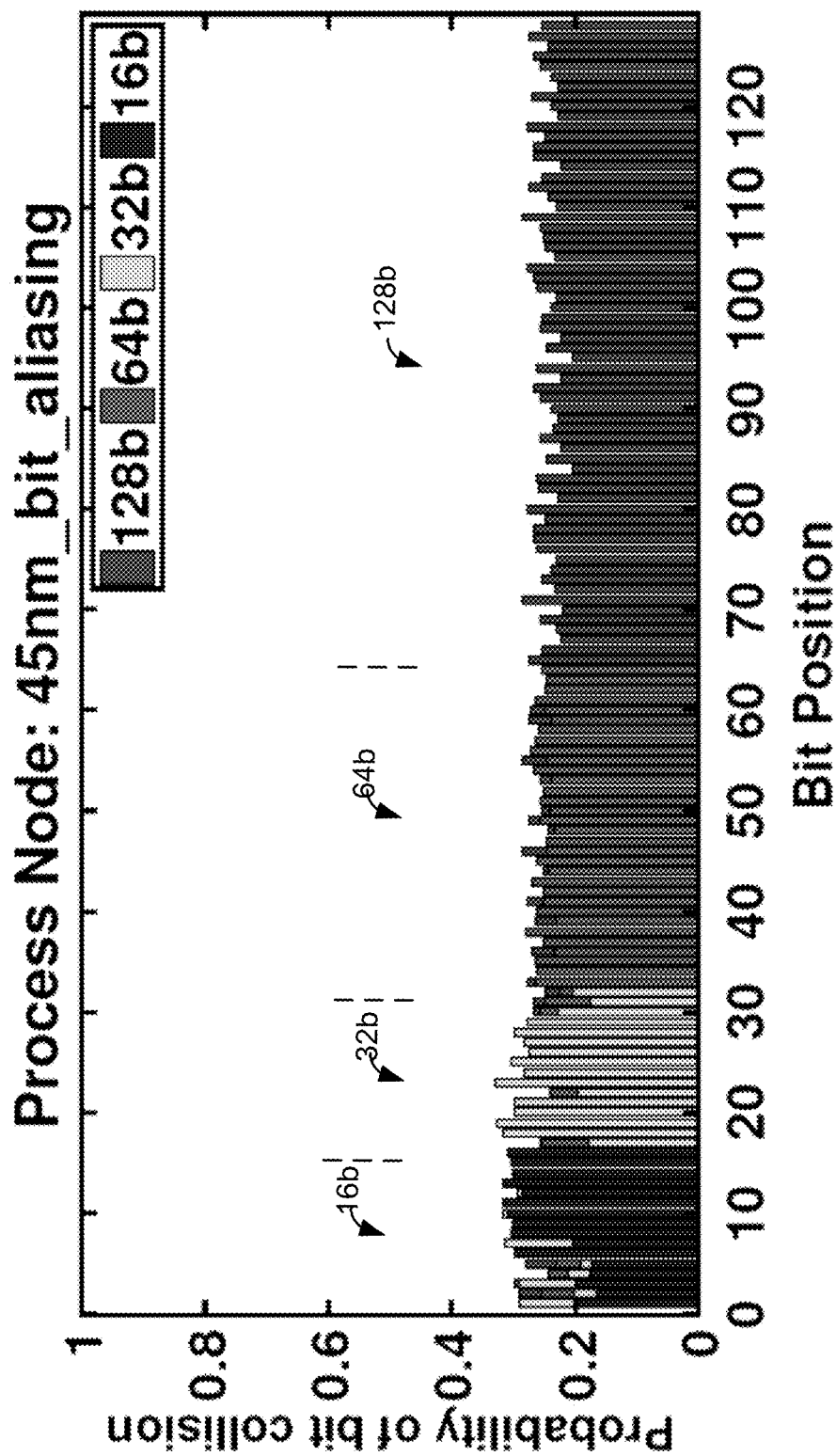
Figure 7C:
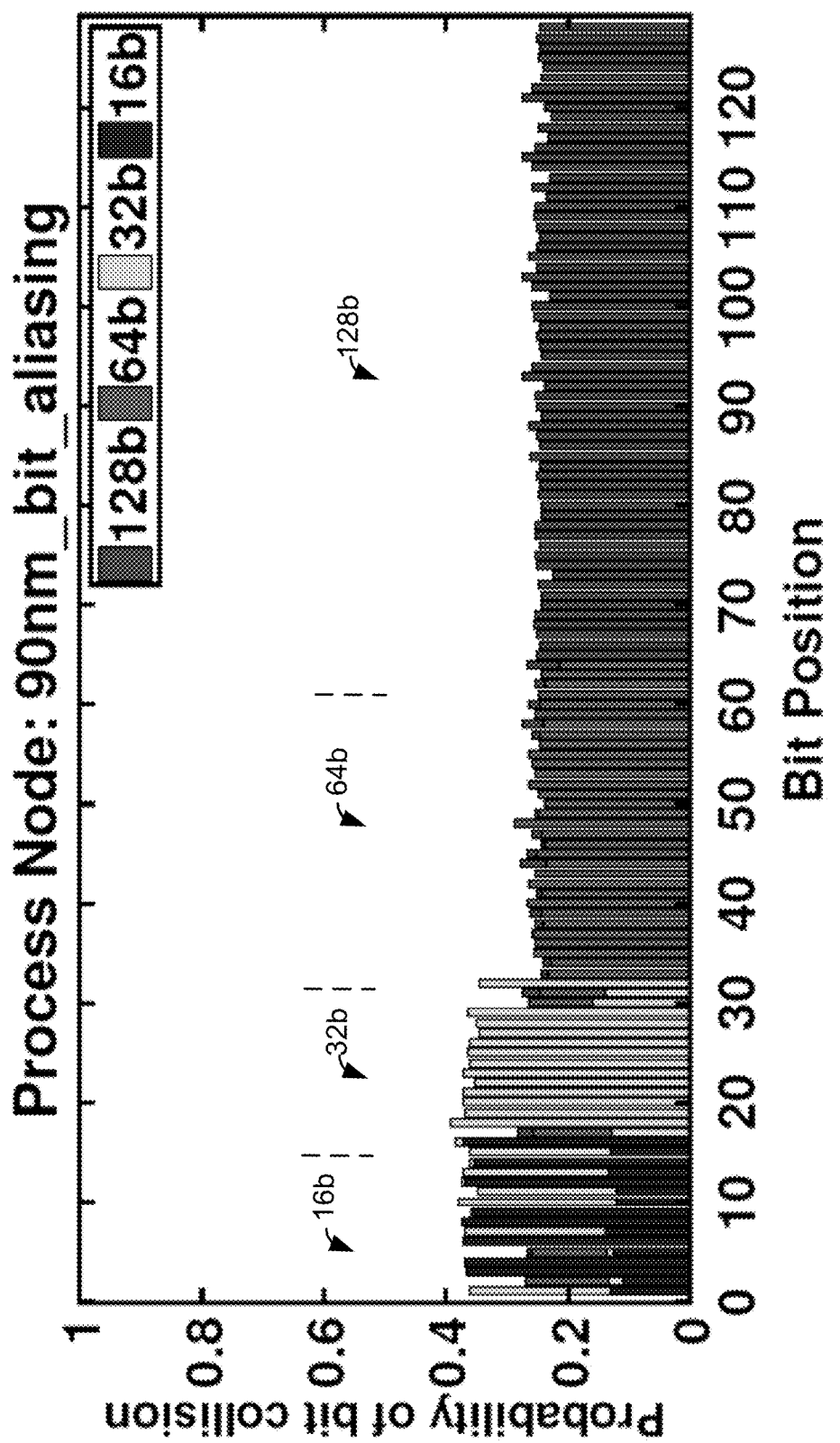

To evaluate the bit aliasing, the same set of responses in uniqueness are used, in which the average probability of collision is less than 30%, as shown in FIGS. 7A-7C. As the reference response is chosen randomly and compared to the rest of the responses, an adversary can guess, on average, less than 30% of the correct responses. Hence, the generated responses are resistant to a key-guessing attack.

For physical synthesis analysis, Table I (see below) lists the required resistance and capacitance (routing and parasitic) values during cell characterization for achieving metastable state in one embodiment being tested for three design corners (best-case, typical-case, and worst-case). Accordingly, the inter-transistor routing across all wire load models are presented in Table II (see below). For this analysis, input voltages (0.7V-1.32V) are varied with on-chip variation enabled during synthesis. The number of bits in Table III (see below) represent the possible key length of design. Across different wire load models of a particular design corner, more delay and power variations are observed due to variable resistance and capacitance. For an 8-bit microprocessor (μP), the centroid architecture is adjacent to high-activity logic; hence, increased PPA (power, performance, area) overhead is seen. In the remaining designs, best-case minimizes the area and delay overhead and during worst-case, a reduction in power overhead is seen.

TABLE I

| Wireload Model | Best | | Typical | | Worst | |
| --- | --- | --- | --- | --- | --- | --- |
| | Cap. | Res. | Cap. | Res. | Cap. | Res. |
| 8000 | 0.00028 | 1.42E−03 | 0.000312 | 1.57E−03 | 0.000343 | 1.73E−03 |
| 16000 | 0.000512 | 1.15E−03 | 0.000569 | 1.28E−03 | 0.000625 | 1.41E−03 |

TABLE I-continued

| Wireload Model | Best | | Typical | | Worst | |
|---|---|---|---|---|---|---|
| | Cap. | Res. | Cap. | Res. | Cap. | Res. |
| 35000 | 0.000243 | 1.07E−03 | 0.00027 | 1.19E−03 | 0.000297 | 1.31E−03 |
| 70000 | 0.000128 | 9.00E−03 | 0.000143 | 1.00E−02 | 0.000157 | 1.10E−02 |

TABLE II

| Wire Width | (0.45, 0.9, 1.35, 1.8, 2.25) |
|---|---|
| Wire Spacing | (0.45, 0.9, 1.35, 1.8, 2.25, 2.7, 3.15, 3.6, 4.05, 4.5, 4.95, 5.4, 5.85, 6.3, 6.75, 7.2) |

TABLE III

| Design | No. of Bits | Best-Case | | | Typical-Case | | | Worst-Case | | |
|---|---|---|---|---|---|---|---|---|---|---|
| | | Area (%) | Power (%) | Delay (%) | Area (%) | Power (%) | Delay (%) | Area (%) | Power (%) | Delay (%) |
| AES128 | 1072 | 0.009 | 4.065 | 2.622 | 0.017 | 1.301 | 3.836 | 0.320 | 0.473 | 6.671 |
| DES | 1827 | 0.022 | 0.963 | 0.824 | 0.037 | 0.39 | 1.923 | 0.604 | 0.058 | 3.968 |
| Triple DES | 2083 | 0.010 | 0.698 | 0.781 | 0.035 | 0.510 | 1.858 | 0.711 | 0.067 | 3.095 |
| 8-bit uP | 386 | 0.584 | 4.884 | 0 | 2.51 | 2.658 | 0.175 | 4.185 | 0.021 | 6.096 |
| Cannyedge Detector | 2027 | 0.109 | 1.587 | 1.354 | 2.487 | 0.164 | 5.812 | 3.585 | 0.101 | 6.676 |
| Average | | 0.146 | 2.439 | 1.116 | 1.017 | 1.004 | 2.720 | 1.881 | 0.144 | 5.301 |

In general, embodiments of the present disclosure use the existing SR flip-flop device in a new SR-FF based PUF design to quantify its race condition for PUF implementation. In various embodiments, the present disclosure embeds a centroid architecture with SR-FFs so that PUF responses conform to local transistor variations only. The generated responses exhibit better uniqueness, randomness, reliability and reduced bit-aliasing compared to other metastability-based PUFs. In various embodiments, the present disclosure also performs layout-level simulation with foundry data on multiple designs (e.g., 5 designs) that incorporate SR-FF and present their figures of merit (power, timing, and area) in the present disclosure. Accordingly, embodiments of a SR-FF based PUF device in accordance with the present disclosure utilizes SR-FFs already present in the register of a design without any ECC and helper data. The responses are free from multiple key establishments that can thwart a reliability based attack. Additionally, various embodiments of the SR-FF based PUF device can produce or generate an input dependent random yet stable binary sequence aided by unpredictable manufacturing variability. Depending on input challenges, only a fraction or subset of SR-FFs may be utilized to create a unique device signature. Therefore, by using a subset of available SR-FFs, it will increase the attacker reverse engineering effort to determine the exact location of such SR-FFs that participate in PUF responses generation. Additionally, various embodiments of the SR-FF PUF device are implemented having a centroid architecture such that surrounding transistor variations only affect PUF responses, and the associated overhead through layout-based synthesis can be evaluated.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the disclosure. All such modifications and variations are intended to be included herein within the scope of this disclosure and protected by the following claims.

The invention claimed is:

1. A physical unclonable function device comprising:
   an integrated circuit having a plurality of set/reset flip flop logic circuits, wherein each of the set/reset flip flop logic circuits enters a stable but random state for a particular input sequence;
   a controller embedded in the integrated circuit to extract a unique identifier for the integrated circuit from an output response of the set/reset flip flop logic circuits, wherein each set/reset flip flop logic circuit generates a single bit of the unique identifier; and
   a plurality of input multiplexers, each of the plurality of input multiplexers being associated with one of the grids of set/reset flip flop logic circuits, wherein each input multiplexer has a three selector bit, of which, two input bits are used to select an set/reset flip flop logic device in a grid and the remaining input bit is used for determining a mode of operation for the integrated circuit between a regular mode of operation and a non-regular mode of operation that generates the unique identifier.

2. The device of claim 1, wherein the set/reset flip flop logic circuits are a combination of NAND gates.

3. The device of claim 2, wherein the particular input sequence for a Set and Reset inputs for one of the set/reset flip flop logic circuits is 1/1 followed by 0/0.

4. The device of claim 3, further comprising an additional plurality of set/reset flip flop logic circuits that do not receive the particular input sequence and do not generate a single bit for the unique identifier.

5. The device of claim 4, wherein the plurality of set/reset flip flop logic circuits and the additional plurality of set/reset flip flop logic circuits are arranged in a centroid architecture of grids of set/reset flip logic circuits.

6. The device of claim 1, further comprising an input multiplexer that is configured to select a regular mode of operation for the integrated circuit in which the particular input sequence is prohibited from being applied to the plurality of set/reset flip flop logic circuits or a non-regular mode of operation for the integrated circuit in which the particular input sequence is applied to the plurality of set/reset flip flop logic circuits.

7. The device of claim 1, further comprising an additional plurality of set/reset flip flop logic circuits that do not receive the particular input sequence and do not generate a single bit for the unique identifier.

8. The device of claim 7, wherein a channel length and threshold voltage of asset/reset flip flop logic circuit for each of the additional plurality of set/reset flip flop logic circuits are not varied to enable generating the stable but random output in response to the particular input sequence.

9. The device of claim 7, wherein the plurality of set/reset flip flop logic circuits and the additional plurality of set/reset flip flop logic circuits are arranged in a centroid architecture of grids of set/reset flip logic circuits.

10. The device of claim 9, further comprising a plurality of input multiplexers, each of the plurality of input multiplexers being associated with one of the grids of set/reset flip flop logic circuits, wherein each input multiplexer has a three selector bit, of which, two input bits are used to select an set/reset flip flop logic device in a grid and the remaining input bit is used for determining a mode of operation for the integrated circuit between a regular mode of operation and a non-regular mode of operation that generates the unique identifier.

11. A method for implementing a physical unclonable function device comprising:
providing an integrated circuit having a plurality of set/reset flip flop logic circuits, wherein each of the plurality of set/reset flip flop logic circuits are a combination of NAND gates, wherein each of the set/reset flip flop logic circuits enters a metastable state for a particular input sequence, wherein the integrated circuit further comprises a plurality of input multiplexers, each of the plurality of input multiplexers being associated with one of the grids of set/reset flip flop logic circuits, wherein each input multiplexer accepts an input comprising three input bits;
varying circuit parameters of an output NAND gate for each of the plurality of set/reset flip flop logic circuits to account for manufacturing variations in the set/reset flip flop logic circuits and enable generating a stable but random output in response to the particular input sequence;
applying the particular input sequence to the integrated circuit; and
deriving a unique identifier for the integrated circuit from an output response of the plurality of set/reset flip flop logic circuits, wherein each set/reset flip flop logic circuit generates a single bit of the unique identifier.

12. The method of claim 11, wherein the circuit parameters comprises at least one of a transistor channel length or a threshold voltage.

13. The method of claim 11, further comprising selectively choosing an output voltage of a set/reset flip flop logic circuit when a set of input signals are applied to the set/reset flip flop logic circuit.

14. The method of claim 11, wherein the particular input sequence for a Set and Reset inputs for one of the set/reset flip flop logic circuits is 1/1 followed by 0/0.

15. The method of claim 11, further comprising selecting a regular mode of operation for the integrated circuit in which the particular input sequence is prohibited from being applied to the plurality of set/reset flip flop logic circuits or a non-regular mode of operation for the integrated circuit in which the particular input is applied to the plurality of set/reset flip flop logic circuits causing the unique identifier to be generated.

16. The method of claim 11, wherein the integrated circuit further comprises an additional plurality of set/reset flip flop logic circuits that are prohibited from receiving the particular input sequence and thereby do not generate a single bit for the unique identifier.

17. The method of claim 16, wherein a channel length and threshold voltage of an output NAND gate for each of the additional plurality of set/reset flip flop logic circuits are not varied to enable generating the stable but random output in response to the particular input sequence.

18. The method of claim 17, wherein the plurality of set/reset flip flop logic circuits and the additional plurality of set/reset flip flop logic circuits are arranged in a centroid architecture of grids of set/reset flip logic circuits.

19. The method of claim 18, further comprising:
selecting, using two of the three input bits, a set/reset flip flop logic device in a grid, wherein the set/reset flip flop logic device is one of the plurality of set/reset flip flop logic devices; and
determining, using the remaining input bit of the three input bits, a mode of operation for the selected set/reset flip flop logic device between a regular mode of operation that is prohibited from responding to the particular input sequence and a non-regular mode of operation that is configured to respond to the particular input sequence by generating an output bit for the unique identifier of the integrated circuit.

20. A physical unclonable function device comprising:
an integrated circuit having a plurality of set/reset flip flop logic circuits, wherein each of the set/reset flip flop logic circuits enters a stable but random state for a particular input sequence, wherein the set/reset flip flop logic circuits are a combination of NAND gates, wherein the particular input sequence for a Set and Reset inputs for one of the set/reset flip flop logic circuits is 1/1 followed by 0/0;
a controller embedded in the integrated circuit to extract a unique identifier for the integrated circuit from an output response of the set/reset flip flop logic circuits, wherein each set/reset flip flop logic circuit generates a single bit of the unique identifier;
an additional plurality of set/reset flip flop logic circuits that do not receive the particular input sequence and do not generate a single bit for the unique identifier, wherein the plurality of set/reset flip flop logic circuits and the additional plurality of set/reset flip flop logic circuits are arranged in a centroid architecture of grids of set/reset flip logic circuits; and
a plurality of input multiplexers, each of the plurality of input multiplexers being associated with one of the grids of set/reset flip flop logic circuits, wherein each input multiplexer has a three selector bit, of which, two input bits are used to select an set/reset flip flop logic device in a grid and the remaining input bit is used for determining a mode of operation for the integrated circuit between a regular mode of operation and a non-regular mode of operation that generates the unique identifier.

* * * * *